United States Patent [19]
Feierabend

[11] 3,855,911
[45] Dec. 24, 1974

[54] CENTRIFUGAL JUICE EXTRACTOR
[75] Inventor: Georg Feierabend, Olten, Switzerland
[73] Assignee: Rotel AG, Aarburg, Switzerland
[22] Filed: Apr. 30, 1973
[21] Appl. No.: 355,804

[52] U.S. Cl. .................................................. 99/511
[51] Int. Cl. ......................... A23n 1/02, A47j 19/00
[58] Field of Search ............... 99/495, 496, 509–511

[56] References Cited
UNITED STATES PATENTS

| | | | |
|---|---|---|---|
| 2,228,822 | 1/1941 | Heinrich | 99/511 |
| 2,273,093 | 2/1942 | Drachenberg | 99/511 |
| 2,481,848 | 9/1949 | Lapps | 99/511 |
| 3,407,858 | 10/1968 | Smith et al | 99/511 |
| 3,534,793 | 10/1970 | Wunderlin | 99/511 |

FOREIGN PATENTS OR APPLICATIONS

| | | | |
|---|---|---|---|
| 1,146,627 | 4/1963 | Germany | 99/511 |
| 1,127,044 | 5/1962 | Germany | 99/511 |

Primary Examiner—Donald E. Watkins
Attorney, Agent, or Firm—Kenneth S. Goldfarb

[57] ABSTRACT

A juice extractor for centrifugal extraction of juice comprising a casing having a perforated basket mounted therein. The basket is rotated about its axis and a grating disc is provided at the bottom of the basket as well as a feed tube through which material can be fed into the casing into contact with the grating disc. The basket is so mounted that while it is being driven it can tilt relative to its axis of rotation under asymmetrically distributed loads.

3 Claims, 1 Drawing Figure

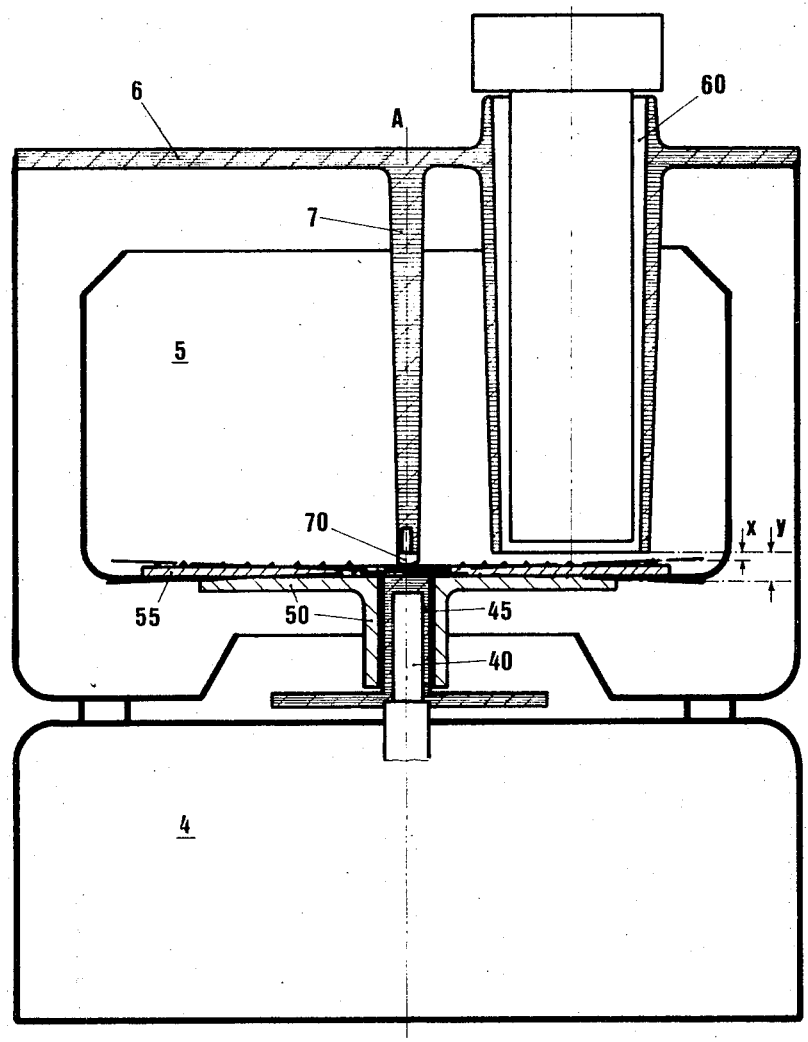

CENTRIFUGAL JUICE EXTRACTOR

This invention relates to a centrifugal juice extractor.

More specifically, the invention relates to a type of juice extractor comprising a rotating perforated basket with a grating disc onto which the feed, e.g., apples or beets, is fed through a feed tube radially spaced from the axis of rotation of the basket. There is a problem involved when adopting such a construction in avoiding conditions of imbalance and prohibitive vibration due to an asymmetrical distribution of the feed in the rotating basket. Such an asymmetric distribution occurs for example as a result of a relatively large piece of skin or rind being ejected from the grating disc. Theoretically such vibration could be avoided by making the centrifuge of very heavy construction but that expedient is quite unsuitable for ordinary domestic appliances.

The present invention aims to provide a solution to this problem.

According to the present invention, there is provided a centrifugal juice extractor comprising a casing, a perforated basket mounted within the casing so that the basket can be rotated about an axis of the basket, drive means for rotating the basket about such axis, a grating disc at the bottom of such basket and a feed tube via which material can be fed into the casing into contact with the grating disc at a position offset from its rotation axis, characterised in that the basket is mounted so that whilst it is being driven it can tilt relative to its axis of rotation under asymmetrically distributed loads.

By virtue of the characterising feature of the invention, any significant asymmetric loading of the basket causes it to tilt, the region where the basket is more heavily loaded undergoing downward movement and the diametrically opposite region moving upwards. As the basket rotates the spacing between the feed tube and the grating disc will therefore vary from one part of a revolution to another. The spacing at the region of the disc which is at the higher level will be smaller than at the diametrically opposite region. At the region where the smaller spacing exists more feed will be grated so that a compensating weight will be created in the basket. Rapid compensation is assisted by the fact that on the heavy side, where the bottom of the basket has moved downwardly, the pressure on the grating disc under the feed-tube will be less so that on that side less feed will be grated.

The drive means may comprise a motor with an upstanding driving shaft with which the basket is engaged in such manner that the required tilting of the basket relative to its rotation axis can take place. The driving shaft and basket may for example be connected via a flexible coupling. The driving motor may if required be adapted for use in driving other kitchen appliances if so required.

An embodiment of the invention, selected by way of example, and also incorporating various optional but advantageous features, will now be described with reference to the accompanying diagrammatic drawing which is a part-sectional cross-sectional elevation of the juice extractor.

The illustrated appliance comprises a basket 5 having a perforated circumferential wall. A grating or rasping disc 55 is fixed to the basket floor.

The underside of the basket is provided with a socket 50 which is fitted on the end of the drive shaft 40 of a driving motor 4. The socket does not fit the shaft precisely. It is deliberately made somewhat too large. However, in order to permit the torque to be transmitted the clearance between shaft and socket is filled with a rubber-elastic composition 45. The basket rotates in a casing having a cover 6 from which a feed tube 60 depends. Likewise projecting centrally from the cover 6 into the basket is a pintle 7 which with its boss 70 bears down on the grating disc. The purpose of this pintle is to prevent the basket or the grating disc from lifting while it spins. The drawing indicates by two chain lines the two admissible limit positions which the grating disc may assume when there is a one-sided accumulation of grated material inside the basket. The differences between the distances $x$ and $y$ measured from the level of the bottom of the feed tube are responsible for the varying grating pressure of the grating disc on the material in the feed tube, and for the consequential differential rate of ejection of grated material into the basket. It is not the distance itself which governs the rate of ejection but the pressure change which results from changes in such distance.

There are various other ways in which the socket 50 can be fitted to the drive shaft 40 in order to permit the required tilting of the grating disc.

For example, the two coupled elements 40 and 50 may be of matching polygonal shape though providing considerable clearance. In another possible arrangement the end 40 of the shaft and/or the socket 50 itself may consist of a flexible material such as hard rubber.

In another modification the end 40 of the shaft of the drive means 4 may be hexagonal and the socket element of the basket 5 a loosely fitting thimble 50 lined with rubber.

What is claimed is:

1. A centrifugal juice extractor comprising a casing having a removable cover, a perforated basket removably and replaceably mounted within the casing so that the basket can be rotated about an axis of the basket, said basket having a light weight socket on the underside thereof, drive means for rotating the basket about such axis, said drive means including a drive shaft extending into said socket and being of a lesser size than said socket so as to fit loosely therein, a rubber elastic composition means in said socket so that said basket is mounted so that while it is being driven it can tilt relative to its axis of rotation under asymmetrically distributed loads, a grating disc at the bottom of such basket and a feed tube via which material can be fed into the casing into contact with the grating disc at a position offset from its rotation axis, a finger depending from said cover for bearing against a central zone of the bottom of the basket so as to prevent said basket and said grating disc from lifting during rotation thereof.

2. A juice extractor according to claim 1 wherein said finger is provided with a boss which bears against the central zone of the bottom of the basket.

3. A juice extractor according to claim 2, wherein said shaft is hexagonal, said socket on said basket being hexagonal.

* * * * *